May 5, 1942.    E. S. WHITTIER    2,282,277

THERMOMETER

Filed Sept. 20, 1940

INVENTOR;
ELMER S. WHITTIER,
BY Romeyn A. Spare
HIS ATTORNEY.

Patented May 5, 1942

2,282,277

UNITED STATES PATENT OFFICE 2,282,277

THERMOMETER

Elmer S. Whittier, Bristol, Conn., assignor to The Cooper Oven Thermometer Company, Pequabuck, Conn., a corporation of Connecticut Application September 20, 1940, Serial No. 357,600

8 Claims. (Cl. 73—367)

This invention relates to thermometers and comprises all of the features of novelty herein disclosed. An object of the invention is to produce an excessively simple, low cost thermometer and one that will be easy to make and assemble. Another object is to produce an improved floating thermometer for use in laundries, baths, etc. Another object is to produce an improved automobile thermometer. Another object is to produce a shock-proof thermometer which will stand rough usage not only in shipment and in use but also in the process of factory manufacture and assembly. Still another object is to produce a thermometer housing which will eliminate several parts previously considered essential and make assembly easy, quick, and accurate.

Figure 1:
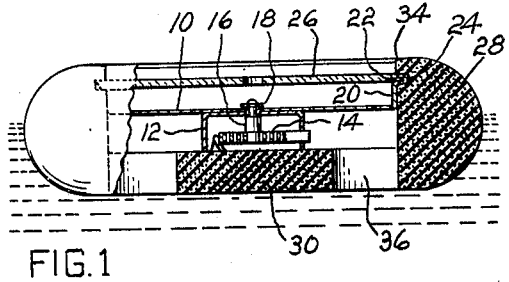
Figure 7:
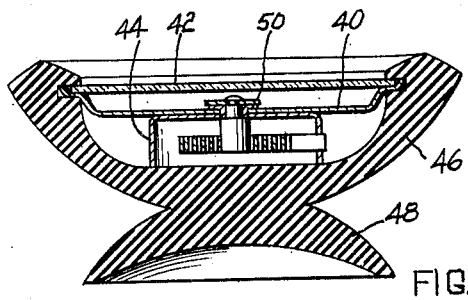
Figure 2:
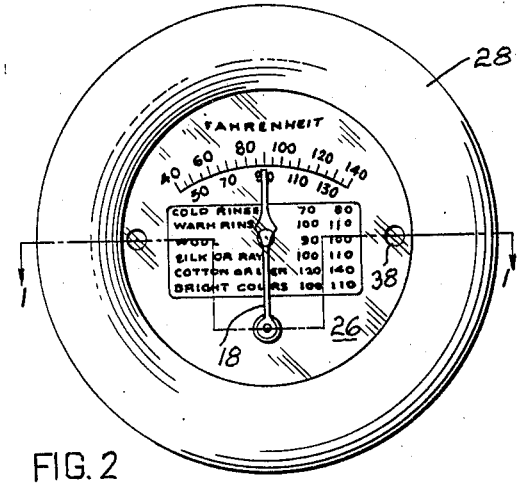
Figure 8:
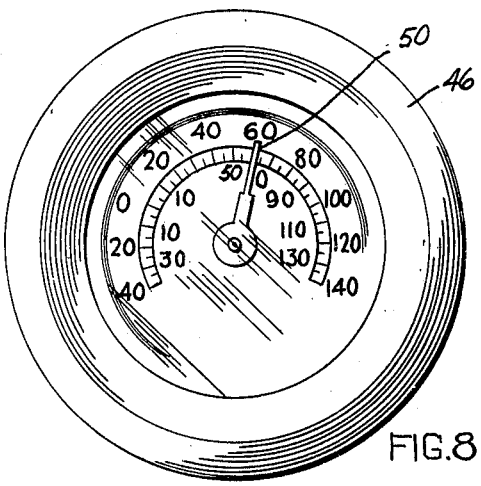
Figure 3:
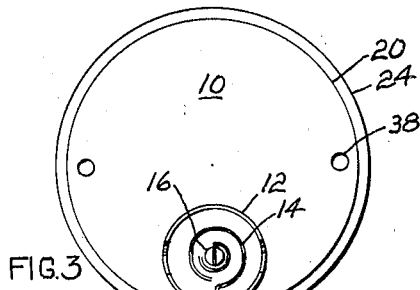
Figure 6:
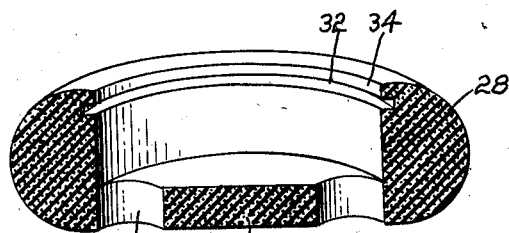
Figure 5:
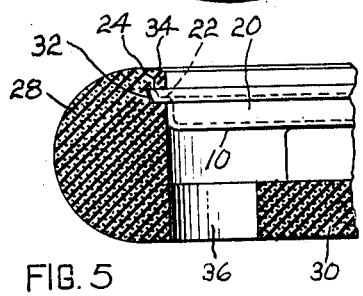
Figure 4:
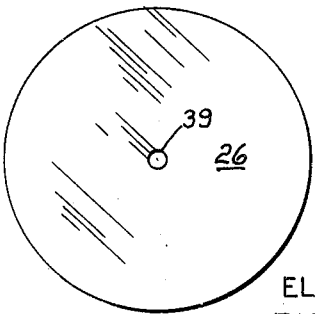

To these ends and also to improve generally upon devices of this character, the invention consists in the various matters hereinafter described and claimed. In its broader aspects, the invention is not necessarily limited to the specific constructions selected for illustrative purposes in the accompanying drawing in which Fig. 1 is a section on line 1—1 of Fig. 2.
Fig. 2 is a plan view.
Fig. 3 is a rear view of a dial plate.
Fig. 4 is a face of a cover.
Fig. 5 is an enlarged detail section of Fig. 1.
Fig. 6 is a sectional view of the housing.
Fig. 7 is a section considerably enlarged of another embodiment.
Fig. 8 is a plan view of Fig. 7.

The numeral 10 indicates a dial plate or support to the back of which, in an off-center position, is secured the bottom wall of a cup-shaped casing 12 which is slotted to anchor one end of the usual bimetallic spiral strip 14 whose other end is secured to an arbor 16 journalled in the dial plate and carrying a pointer 18 movable over the dial. A table of suitable washing temperatures for various fabrics may be placed on the dial as indicated in Fig. 2.

The dial plate 10 has an upright side wall 20 from which projects an annular ledge or raised shelf 22 which is bounded by an upstanding rim 24. The height of the rim is substantially equal to the thickness of a thin transparent disc or cover 26 which rests on the shelf and is centered by the rim. The transparent disc is preferably of light weight material such as pyroxylin which is flexible and not subject to breakage. The foregoing provides only two loose parts for assembly in a one-piece body or housing 28 which is in the form of a cup or ring having a bottom wall 30. The material is preferably of sponge rubber or the like to act as a shock absorber for the protection of the parts during shipment and use and its flexible resilient character makes it of great advantage in assembly as will appear.

The housing 28 has an internal holding groove 32 with an overhanging lip 34 which can be bent or stretched to let in the shelf 22 and its rim 24 together with the outer edge of the transparent cover 26 which is first laid within the rim. No other parts such as metal shells and a bezel are needed to secure the thermometer in its housing as in prior devices and many fastening and assembly operations are eliminated because of the ability to stretch the rubber and snap in the dial assembly and cover between the side walls of the groove. The raised shelf and the rim hold the cover in spaced relation to the dial plate and nicely centered for this assembly operation and makes it possible to use a flat cover instead of a pushed-in dome-shaped cover to clear the pointer. The sponge rubber provides sufficient buoyancy so that the whole unit will float in water even though the bottom wall of the housing has openings 36 to allow the heat from the liquid to reach the heat sensitive strip 14. The dial plate 10 has openings 38 and the cover has an opening 39 to let out hot vapor or steam rising from the liquid. Other suitable light weight resilient material can be substituted for the sponge rubber.

In Figs. 7 and 8, a similar but smaller thermometer for automobiles is disclosed. The dial plate 40 and the transparent cover 42 are made substantially as in the floating thermometer although the casing 44 for the spiral strip is at the center. The parts are assembled in a groove of the body or housing 46 in the same way. The material is preferably rubber and the bottom of the housing is made integral with a vacuum cup 48 to stick on a windshield. This eliminates many parts previously considered necessary in automobile thermometers. Painting or enameling operations are also eliminated yet decorative effect can be obtained by using mixed colored or mottled rubber. The temperature scale for the pointer 50 preferably is continued to a lower degree of temperature than the scale in the floating thermometer.

I claim:

1. In a thermometer, a dial plate, heat indicating means carried by the dial plate, a cup-shaped housing of elastic, shock-absorbing material to protect said parts comprising a round body having a bottom wall and an annular side wall, the side wall having an internal holding groove with an overhanging lip, the dial plate having an annular rim portion adapted to enter the groove and the lip being located near the open end of the cup and being sufficiently elastic to stretch to a diameter exceeding the diameter of the dial plate to let the latter get in the groove.

2. In a thermometer, a dial plate, heat indicating means carried by the dial plate, a cup-shaped housing for said parts comprising a round body having a bottom wall and an annular side wall of elastic material, the side wall having an internal holding groove with an overhanging elastic lip near one end, the dial plate having an outwardly projecting annular shelf, a transparent disc supported by the shelf concentric with the shelf, and the overhanging lip being sufficiently elastic to stretch to a diameter exceeding the diameter of the dial plate and the disc to let said parts enter the groove and be gripped by its side walls.

3. In a thermometer, a dial plate, heat indicating means carried by the dial plate, the dial plate having an outwardly projecting annular shelf with an upstanding rim, a transparent disc supported by the shelf and centered by the inner wall of the rim, a housing of elastic material having an internal holding groove whose side walls embrace the shelf and the outer edges of the disc, and one side wall being elastic to stretch around the dial plate and the disc and hold the two together.

4. In a thermometer, a dial plate, heat indicating means carried by the dial plate, the dial plate having an outwardly projecting annular shelf with an upstanding rim, a transparent disc supported by the shelf and centered by the inner wall of the rim, a housing having an internal holding groove whose side walls embrace the shelf and the outer edges of the disc, and one side wall of the groove being resiliently yieldable to stretch over the outer edges of the assembled disc and shelf.

5. In a thermometer, a cup shaped housing of shock-absorbing elastic material, a cup-shaped dial plate in the housing and having its bottom wall spaced from the bottom wall of the housing, heat sensitive means in the space between said bottom walls, a pointer on the open side of the dial plate and connected to the heat sensitive means for actuation thereby, a transparent disc covering said pointer, the dial plate and the disc having concentric peripheral portions received in an internal groove in the housing, and said groove being near the open end of the housing to facilitate manual stretching of the elastic material around the dial plate and the disc.

6. In a floating thermometer, a cup-shaped housing having a thick side wall of elastic shock-absorbing material lighter than water, the bottom wall of the housing being apertured and the side wall being internally provided with an annular groove near its open end to leave an overhanging elastic lip adapted to be manually stretched, a cup-shaped dial plate having a bottom wall spaced from the bottom wall of the housing, the side wall of the dial plate lying within the side wall of the housing and having an outwardly projecting annular rim, heat responsive means mounted in the space between the two bottom walls for actuating a pointer on the outer side of the dial plate, a transparent disc seated flatwise on said outwardly projecting rim, the outer periphery of the disc and the annular rim being entered within the groove upon distortion of said elastic lip and the lip holding said seated parts together.

7. In a thermometer, a cup-shaped housing having a bottom wall and a thick side wall of elastic shock absorbing material, the side wall being internally provided with an annular groove near the open end of the housing to leave an overhanging elastic lip adapted to be manually stretched, a cup-shaped dial plate having its bottom wall spaced from the bottom wall of the housing, the side wall of the dial plate lying within the side wall of the housing and having an outwardly projecting annular rim, heat responsive means in the space between the two bottom walls for actuating a pointer on the outer side of the dial plate, a transparent disc seated flatwise on said outwardly projecting rim, the outer periphery of the disc and the annular rim being entered within the groove upon distortion of said elastic lip and the lip holding said seated parts together, and all of the foregoing elements except the elastic material lying within the outline of the latter and protected thereby.

8. In a thermometer, a cup-shaped housing having a bottom wall and a thick side wall of elastic shock absorbing material, the side wall being internally provided with an annular groove near the open end of the housing to leave an overhanging elastic lip adapted to be manually stretched, a cup-shaped dial plate having its bottom wall spaced from the bottom wall of the housing, the side wall of the dial plate lying within the side wall of the housing and having an outwardly projecting annular rim, heat responsive means in the space between the two bottom walls for actuating a pointer on the outer side of the dial plate, a transparent disc seated flatwise on said outwardly projecting rim, the outer periphery of the disc and the annular rim being entered within the groove upon distortion of said elastic lip and the lip holding said seated parts together, and a vacuum cup integrally united with said bottom wall of the housing.

ELMER S. WHITTIER.